United States Patent
Garst, Jr. et al.

(10) Patent No.: US 8,255,436 B2
(45) Date of Patent: **\*Aug. 28, 2012**

(54) PER THREAD GARBAGE COLLECTION

(75) Inventors: Gerald Blaine Garst, Jr., Los Altos, CA (US); Gregory Robert Parker, Cupertino, CA (US); Douglas Joshua Behnke, Sunnyvale, CA (US); Patrick C. Beard, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/158,332

(22) Filed: Jun. 10, 2011

(65) Prior Publication Data
US 2011/0238713 A1    Sep. 29, 2011

Related U.S. Application Data

(63) Continuation of application No. 12/154,271, filed on May 21, 2008, now Pat. No. 7,991,808.

(51) Int. Cl.
*G06F 17/30* (2006.01)

(52) U.S. Cl. ..................................... 707/820
(58) Field of Classification Search .................. None
See application file for complete search history.

(56) References Cited

U.S. PATENT DOCUMENTS

| | | | | |
|---|---|---|---|---|
| 5,842,016 A | * | 11/1998 | Toutonghi et al. | 718/106 |
| 6,526,422 B1 | * | 2/2003 | Flood et al. | 1/1 |
| 6,671,707 B1 | * | 12/2003 | Hudson et al. | 1/1 |
| 6,934,741 B2 | * | 8/2005 | Shavit et al. | 709/214 |
| 6,993,540 B2 | * | 1/2006 | Hudson et al. | 1/1 |
| 7,092,978 B2 | * | 8/2006 | Garthwaite | 1/1 |
| 7,197,521 B2 | * | 3/2007 | Subramoney et al. | 1/1 |
| 7,844,973 B1 | * | 11/2010 | Dice | 718/108 |
| 2003/0023655 A1 | * | 1/2003 | Sokolov et al. | 709/1 |

* cited by examiner

*Primary Examiner* — Apu Mofiz
(74) *Attorney, Agent, or Firm* — Van Pelt, Yi & James LLP

(57) ABSTRACT

Per thread garbage collection is disclosed. Objects associated only with a thread that created them are tracked. At a garbage collection time for a particular thread, it is determined which objects associated only with that thread remain reachable from a restricted root set associated with the thread. Any thread-only objects that are not determined to be reachable are garbage collected.

29 Claims, 8 Drawing Sheets

PER THREAD GARBAGE COLLECTION

CROSS REFERENCE TO OTHER APPLICATIONS

This application is a continuation of co-pending U.S. patent application Ser. No. 12/154,271 entitled PER THREAD GARBAGE COLLECTION filed May 21, 2008 which is incorporated herein by reference for all purposes.

BACKGROUND OF THE INVENTION

In computing, "garbage collection" refers to a technique used to manage in an automated fashion memory blocks that have been allocated for use by programs using objects associated with a runtime system, without requiring that the programs themselves or other application code with which such memory blocks are associated keep track of and when finished de-allocate said memory blocks. Blocks that are roots (e.g., stack local variables and global variables and those registered as being held externally) and/or that are reachable from a root block via a chain of one or more explicit or "strong" references are kept alive, while blocks that are no longer reachable, indicating they are no longer in use (i.e., referenced by) by any live object, are "garbage collected", that is, de-allocated and returned to the runtime system, thus making available for other use the memory allocated previously to such objects. Providing a "garbage collected" runtime system simplifies the task of application developers and avoids problems, such as "memory leaks", crashes due to stale references to prematurely de-allocated blocks, and other related failures, that can occur if memory resources allocated to application objects are not released when and only when such objects are no longer in use.

Garbage collection typically has been performed by a central garbage collection or thread for all threads associated with objects stored in a memory "heap". In so-called "generational" garbage collection, allocation of memory to new objects and the writing into relatively old objects of references to such new objects are tracked, which allows for a quicker but not comprehensive garbage collection to be performed with respect to newer objects that are no longer reachable, since many objects (e.g., temporary objects) are created, used, and no longer referenced and/or needed very shortly after their creation, such that by finding and collecting only those relatively newer objects that are no longer reachable memory associated with a good proportion of unreachable objects can be recovered than would be possible if older objects had to be checked as well. In both traditional and generational garbage collection, typically a set of objects that spans across all threads are checked for reachable and objects that are not determined to be reachable are garbage collected. Some garbage collectors may move objects that are not garbage collected, for example to defragment the heap, which requires that all references to such objects be updated. A "conservative" or "non-moving" garbage collector, on the other hand, is one that does not move objects found to be reachable. A "concurrent" garbage collector is one that does not require that all threads be halted while garbage collection is being performed.

BRIEF DESCRIPTION OF THE DRAWINGS

Various embodiments of the invention are disclosed in the following detailed description and the accompanying drawings.

DETAILED DESCRIPTION

Figure 1A:
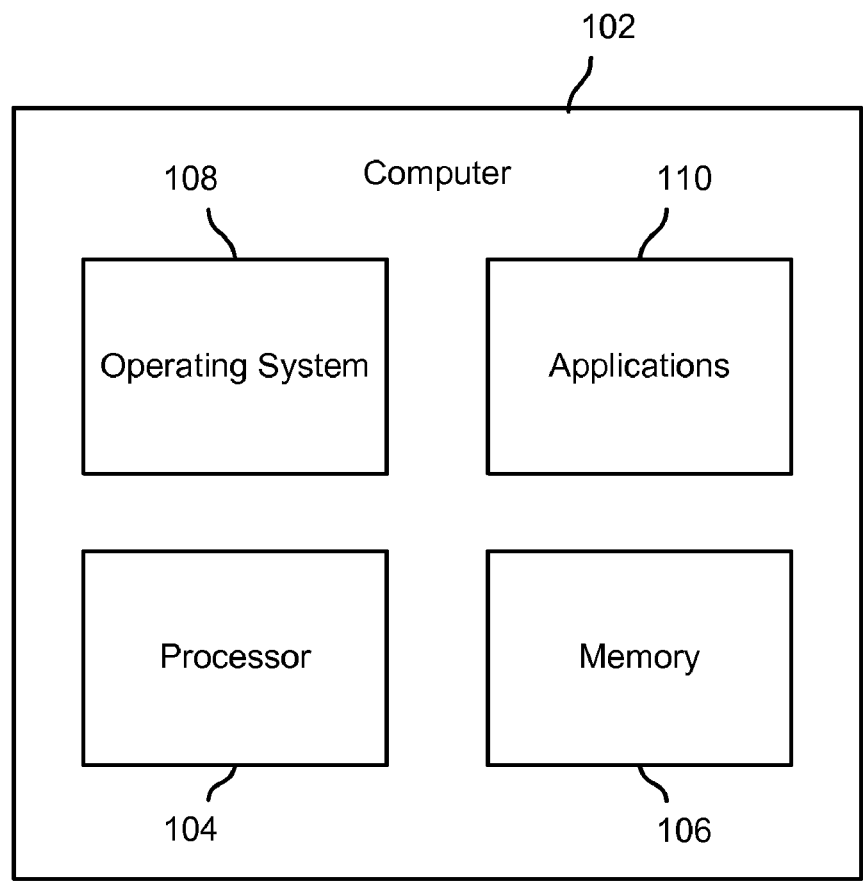
FIG. 1A is a block diagram illustrating an embodiment of a computer system.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Per thread garbage collection is disclosed. In some embodiments, per thread garbage collection is performed in the context of a conservative collector, such as a conservative, generational, concurrent collector. For each of a plurality of threads associated with a heap or other shared memory pool, a set of objects associated only with that thread is tracked. Objects created by the thread are added to the set, and an object is removed from the set—and recursively all objects in the set that are referenced by an object that is removed from the set—if a reference to the hitherto thread-only object is written into an object that is not in that thread-only set, or is written to global storage such that other threads might access it, or otherwise made available to other threads as provided by the garbage collection system, for example if the object is marked as having references stored externally, or if references to the object are registered with a weak reference system. Periodically, or upon occurrence of pre-configured or other event, a per thread garbage collection is performed. Objects in the thread-only set for that thread are checked to determine which remain reachable from a reduced root set that includes only references from entities associated only with that thread, excluding, e.g., global variables, local variables associated with other threads, etc. Objects in the thread-only set that are not determined to be reachable are garbage collected. In various embodiments, finalization may be performed, if needed, e.g., by the thread itself or a separate finalization process common to all threads. In some embodiments, space associated with a thread-only object that is garbage collected in a per thread garbage collection may be reclaimed and/or reused by the thread itself, without returning the memory locations to a central pool. In various embodiments, per thread garbage collection allows for garbage collection to be performed relatively quickly, because only the thread-only set is traversed. In some embodiments, per thread garbage collection is performed in the context of a generational conservative collector, i.e., one that treats relatively newer objects differently than older ones (generational) and that does not copy objects from their initial location to a better one over time (conservative).

FIG. 1A is a block diagram illustrating an embodiment of a computer system. In the example shown, the computer 102 includes a processor 104 and memory 106. An operating system 108 runs on processor 104 and uses memory 106 to store operating system data. One or more applications 110 run in a runtime environment (not shown) running on operating system 108, including by initiating and running on processor 104 one or more processing threads. Each thread uses a portion of a heap memory included in memory 106, which portion has been allocated to the application and/or thread for such use. Examples of use by an application or other thread of heap memory that has been allocated to it is to store in a sub-allocated location data comprising and/or otherwise associated with an object that has been instantiated by the application and/or other thread. A computer such as computer 102 typically includes other hardware and/or software components not shown in FIG. 1A, as is well known.

Figure 1B:
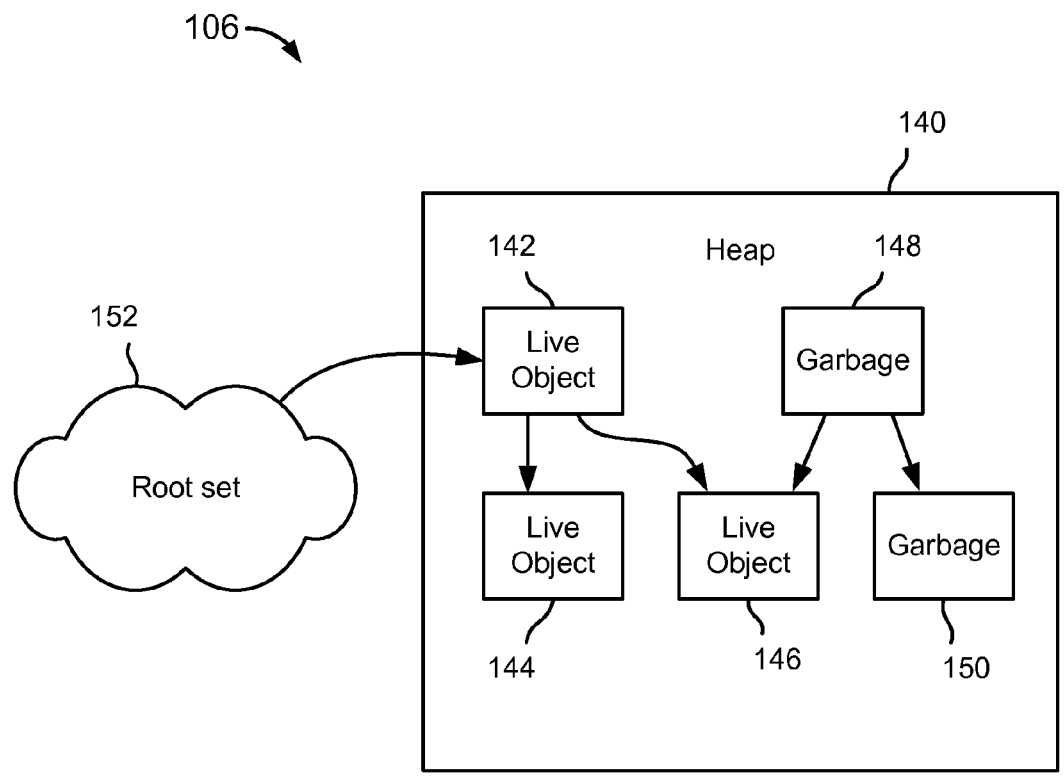
FIG. 1B is a block diagram illustrating an embodiment of a computer memory.

FIG. 1B is a block diagram illustrating an embodiment of a computer memory. In the example shown, memory 106 includes a heap 140 in which objects 142, 144, 146, 148, and 150 are stored. In this example, objects 142, 144, and 146 are live objects that are reachable directly or indirectly from a root set 152. Typically, the root set 152 includes global, stack, and system variables. Objects 148 and 150 are labeled "garbage" in FIG. 1B, because neither is reachable, either directly or indirectly, from the root set 152. Typically, objects that are no longer reachable (and therefore no longer "in use"), such as objects 148 and 150 in the example shown in FIG. 1B, would be identified as "garbage" and "collected", e.g., by being subjected to finalization processing, if required, and associated blocks of memory made available for other use.

Figure 2:
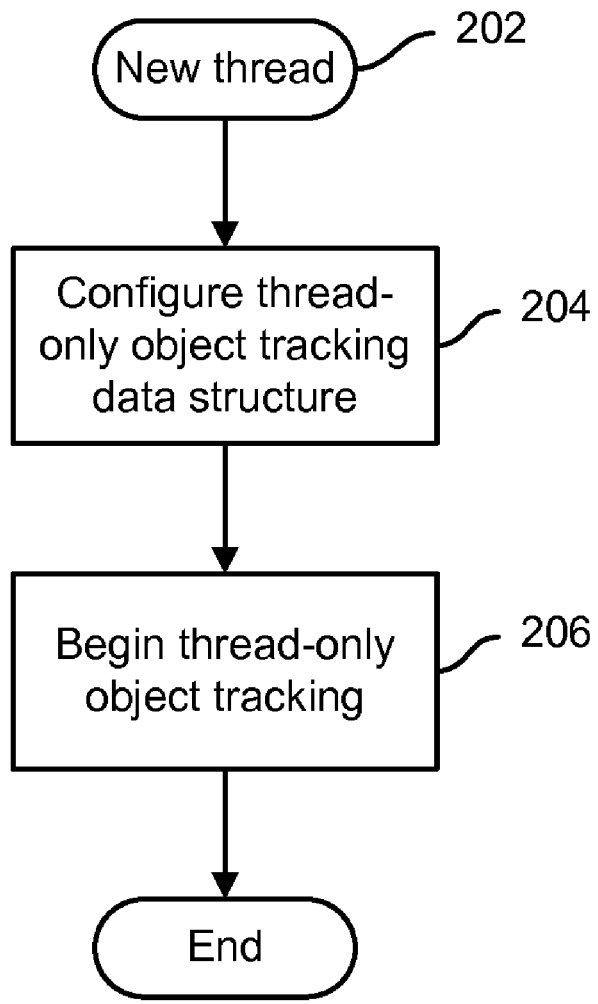
FIG. 2 is a flow chart illustrating an embodiment of a process for per thread garbage collection.

FIG. 2 is a flow chart illustrating an embodiment of a process for per thread garbage collection. In the example shown, an indication of a new thread is received (202). A data structure to be used to track thread-only objects associated with the thread is configured (204). In some embodiments, memory is allocated for a data structure to be used to store data associated with objects associated only with the thread with which the data structure is associated. As used herein, a "thread-only" object is one that does not have any direct or indirect reference from any source other than the stack or machine registers associated with the thread that created the object or from another object created by the same thread. An example of an indirect reference that would result in an object not satisfying the foregoing definition of a "thread-only" object is a referenced object that has only a single reference from a referencing object that was created by the same thread as the referenced object, but which referencing object in turn has a reference to it by an object that was not created by and is not otherwise associated with the thread that created the aforementioned referencing and referenced objects.

Figure 3:
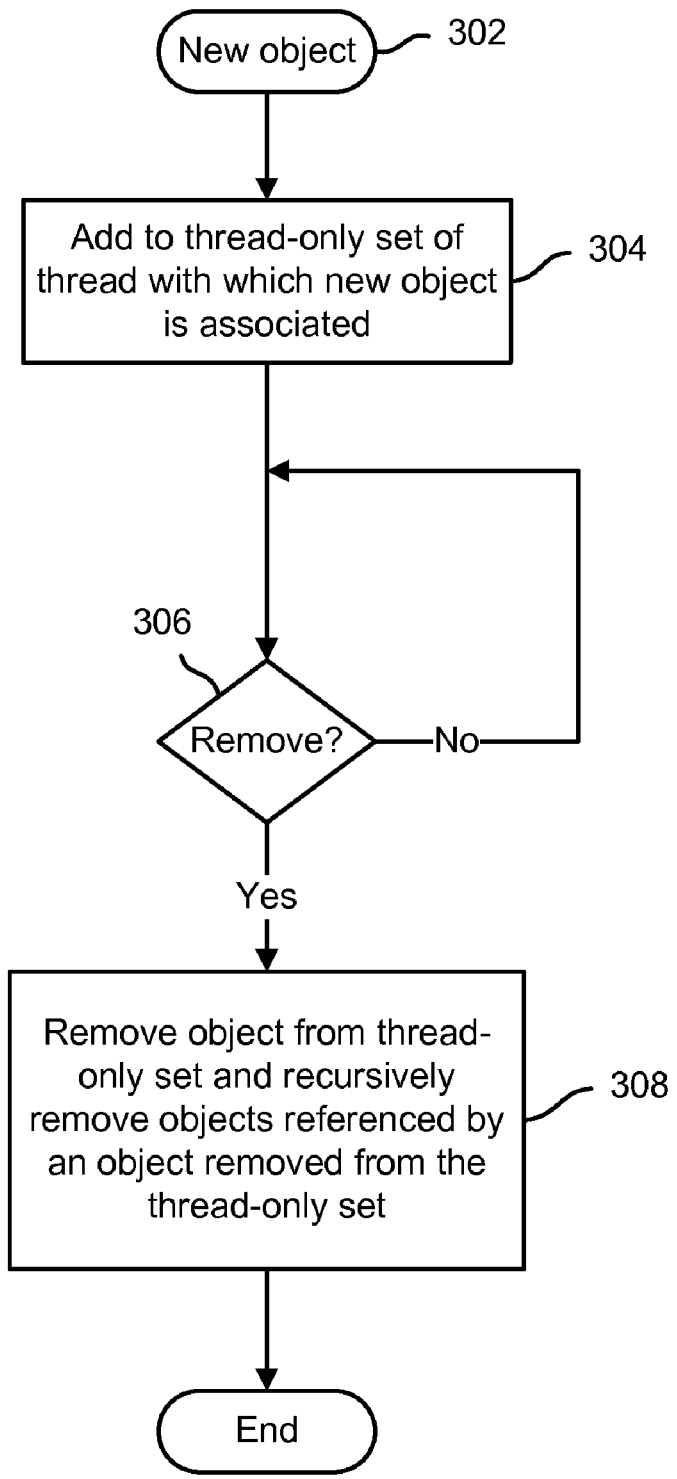
FIG. 3 is a flow chart illustrating an embodiment of a process for tracking thread-only objects.

FIG. 3 is a flow chart illustrating an embodiment of a process for tracking thread-only objects. When a new object is saved (302), it is added to a "thread-only set" associated with the thread that created the new object (304). In some embodiments, adding an object to a "thread-only set" includes marking the object as being in a per-thread set. In some embodiments, a central garbage collection process, such as a generational collector, is configured to ignore objects that are marked as being in a per-thread set. An object remains in the thread-only set unless/until a removal criteria/on is met (306), in which case the object is removed from the thread-only set (308). Examples of a removal criteria/on being met include a reference to the object being written into an object that is not included in the same thread-only set. Other examples of removal criteria/on include a reference to a hitherto thread-only object being written to global storage such that other threads might access it, or otherwise made available to other threads as provided by the garbage collection system, for example if the object is marked as having references stored externally, or if references to the object are registered with a weak reference system. In some embodiments, a write barrier or similar mechanism configured to track references to relatively newer objects, e.g., to facilitate generational garbage collection, is used to determine whether a reference to a thread-only object that may require removal has been made. In some alternative embodiments, in which generational garbage collection is not performed, a write barrier or similar mechanism is provided to facilitate incremental garbage collection on a per-thread basis, as described herein.

Figure 4:
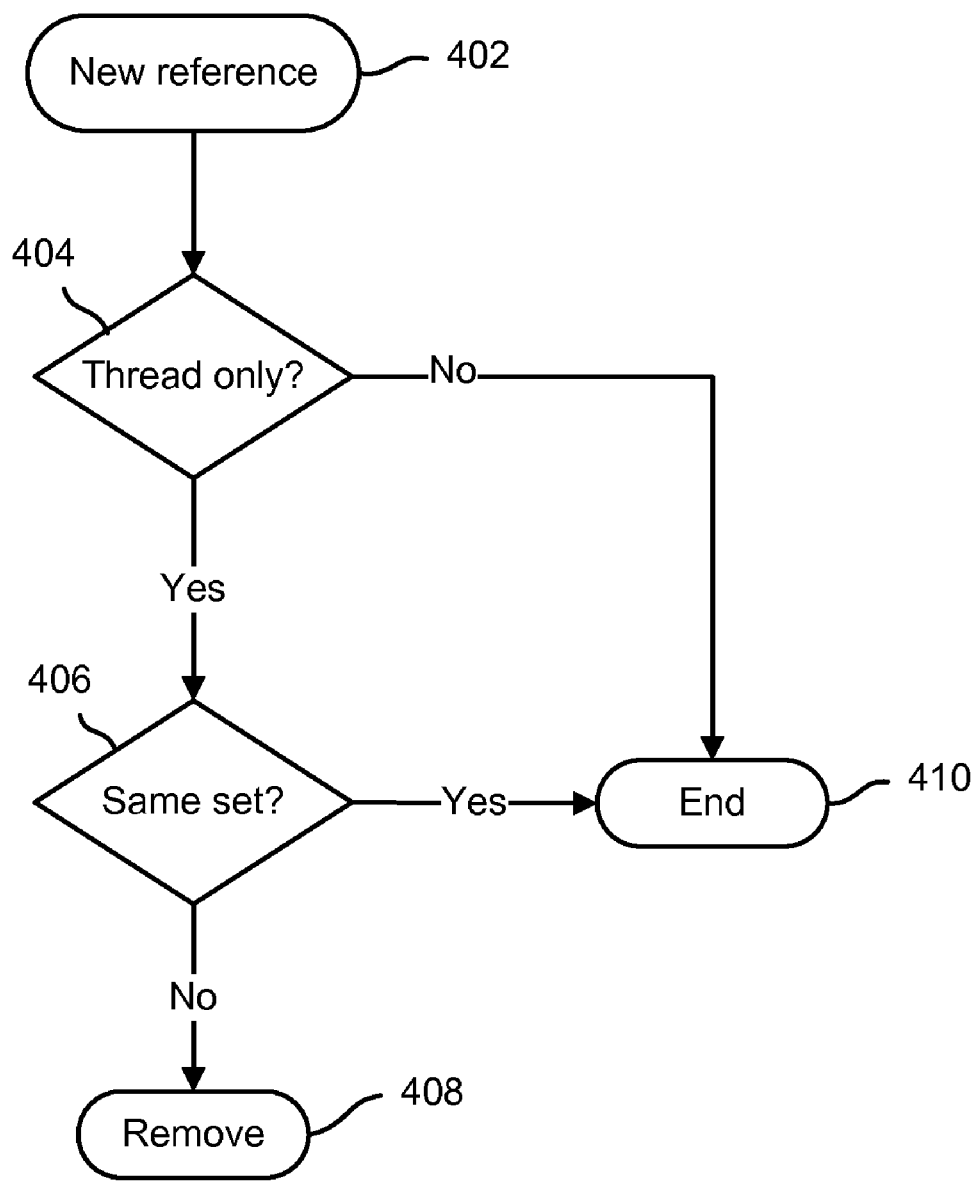
FIG. 4 is a flow chart illustrating an embodiment of a process for monitoring new references for purposes of determining whether a removal criteria/on is met, as in 306 of FIG. 3.

FIG. 4 is a flow chart illustrating an embodiment of a process for monitoring new references for purposes of determining whether a removal criteria/on is met, as in 306 of FIG. 3. In the example shown, an indication is received that a new reference to a referenced object is being (or has been) written into a referencing object (402). In various embodiments, known techniques for monitoring such references are used. For example, in so-called "generational" garbage collection, new references to relatively "young" objects may be tracked to detect when a reference to a relatively newer object is written into an older object. In a subsequent collection cycle in which the continued reachability of only relatively newer objects is checked, only such older object into which references to newer objects have been detected to have been written are included, along with the universe of newer objects, in the set of object traversed to determine reachability of newer objects. In the technique illustrated by the example shown in FIG. 4, in some embodiments the same or a similar mechanism as is used in generational garbage collection to monitor new references between objects is used to determine that a new reference to a referenced object has been written into a referencing object (402), except that references to thread-only objects (as opposed to newer objects) are detected. If the referenced object is not a thread-only object (404), or if the referenced object and the referencing object are both thread-only objects included in the same thread-only set (404 and 406), the process of FIG. 4 ends (410). If, however, the referenced object is thread-only (404) and the referencing object is not included in the same thread-only set as the referenced object—i.e., it is not thread-only and/or is associated with a thread other than the one with which the referenced object is associated—then the referenced object, and recursively all thread-only objects referenced directly or indirectly by the referenced object, is/are removed from the thread-only set (408).

Figure 5:
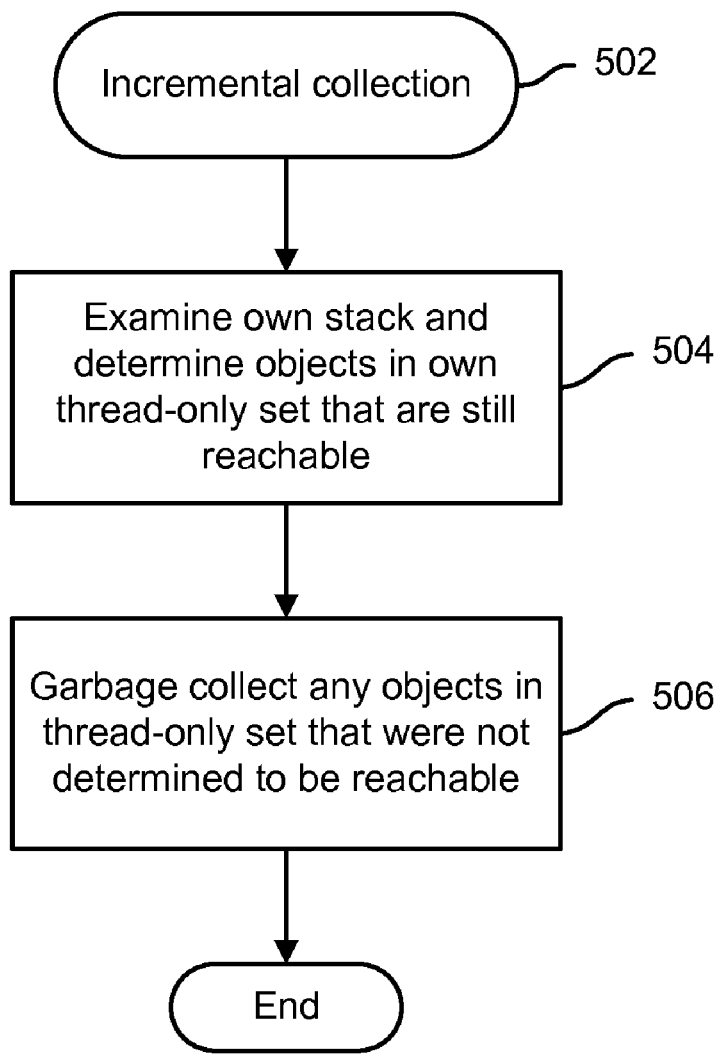
FIG. 5 is a flow chart illustrating an embodiment of a process for performing an incremental garbage collection on a per thread basis.

FIG. 5 is a flow chart illustrating an embodiment of a process for performing an incremental garbage collection on a per thread basis. In the example shown, a thread determines that an incremental per thread garbage collection is to be performed (502). In some embodiments, preconfigured criteria are used to determine that an opportune time to perform garbage collection, e.g., upon a "call out" by the associated thread being detected. The thread examines its own stack and determines which objects in its thread-only set remain reachable (504). In some embodiments, the thread's own stack comprises a reduced root set, which does not include nodes typically included in a root set for garbage collection, such as global variables and/or local variables associated with other threads. In some embodiments, the reduced root set includes the stack and machine registers associated with the thread. Any objects in the thread-only set that were not determined to be reachable directly or indirectly from this reduced root set are garbage collected (506). In some embodiments, thread-only objects determined, in this example by the thread itself, to no longer be reachable are garbage collected by the thread itself, e.g., by making available for reuse by itself one or more memory locations (e.g., blocks) in which data comprising and/or otherwise associated with the object were stored.

Figure 6:
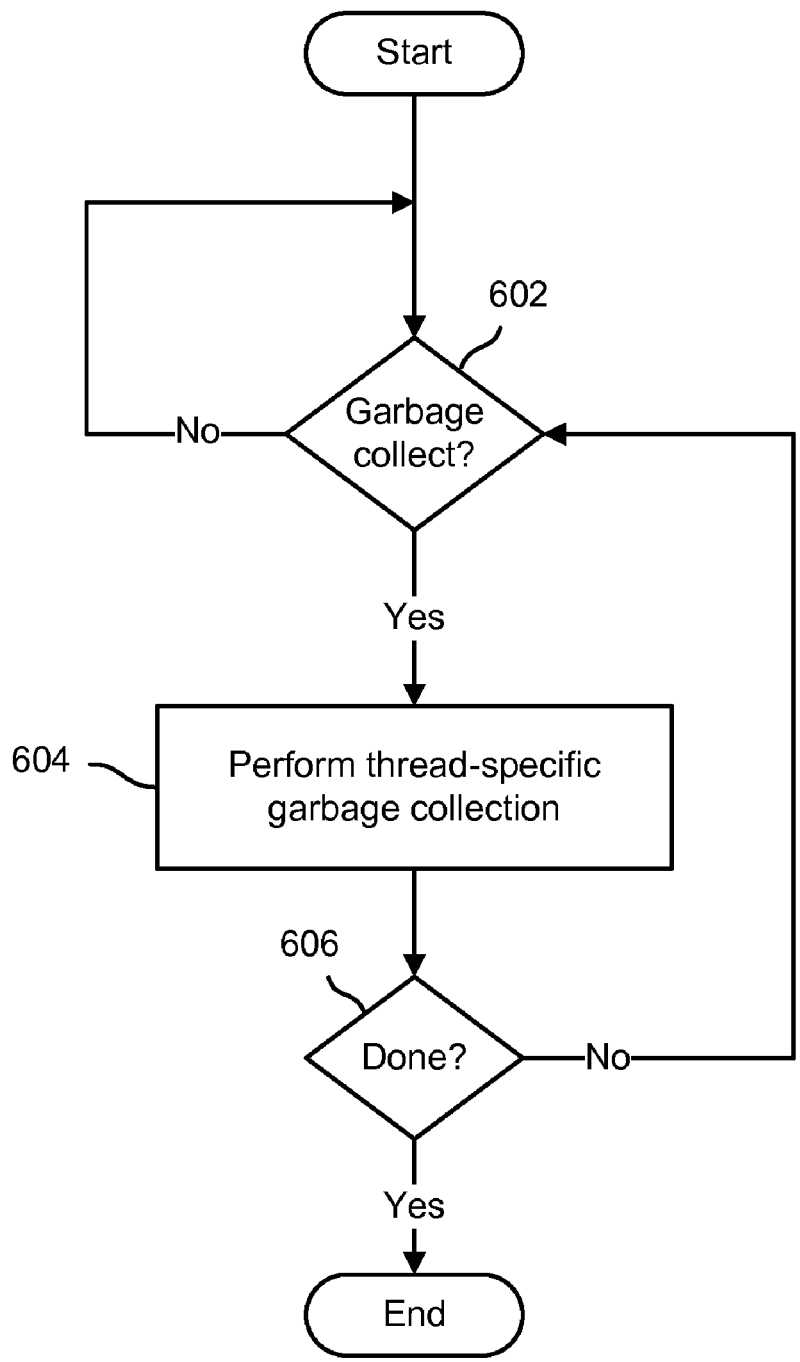
FIG. 6 is a flow chart illustrating an embodiment of a process for determining to perform per thread garbage collection.

FIG. 6 is a flow chart illustrating an embodiment of a process for determining to perform per thread garbage collection. In the example shown, upon determining that a criteria/on for prompting a thread to perform garbage collection with respect to its thread-only object set has been met (602), e.g., a call out by the thread, as mentioned above, the thread performs garbage collection with respect to its thread-only set (604), e.g., as described above in connection with FIG. 5. In some embodiments, the thread is configured to conclude that garbage collection is needed at least in part by determining how much free memory remains in a pool of memory that has been made available (i.e., sub-allocated) to the thread. Steps 602 and 604 are repeated, as applicable, until collection is no longer required (606), e.g., because the thread is no longer running.

Figure 7:
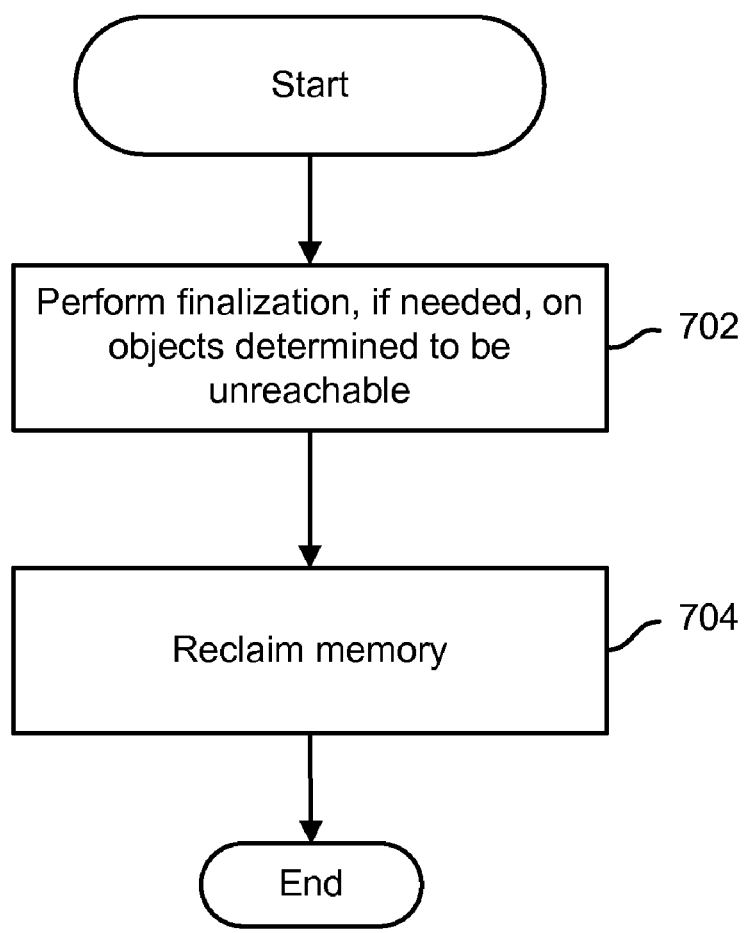
FIG. 7 is a flow chart illustrating an embodiment of a process for performing garbage collection on a per thread basis

FIG. 7 is a flow chart illustrating an embodiment of a process for performing garbage collection on a per thread basis. In the example shown, finalization is performed with respect to unreachable objects, if any, that require finalization (702). In various embodiments, finalization is performed by the thread or is caused to be performed, e.g., by a central garbage collection and/or finalization process. Once finalization has been performed or if no finalization is required, memory associated with the objects being garbage collected is reclaimed (704). In some embodiments, whether an object has ever been stored into another object in the current per-thread set is tracked. If based on such tracking it is determined that an object determined to be unreachable has not ever been stored into another object in the current per-thread set, then the object is finalized (if needed) and reclaimed immediately, in various embodiments to the per-thread allocation cache or a central memory allocator pool. In some embodiments, the set of nodes that both do not need finalization nor are reachable from any that do is determined, and the memory associated with objects in the set is recovered preferentially. In some embodiments, the forgoing optimization is performed where finalization costs are relatively high, such that the cost of determining the set of nodes that both do not need finalization nor are reachable is justified.

Performing garbage collection on a per thread basis, as described herein, in a typical case will allow a substantial proportion of objects that are no longer in use to be garbage collected in relatively quick cycles (due to the reduced root set and reduced set of nodes traversed in each per thread cycle, i.e., just the thread-only objects) with each thread being diverted only at a time that is opportune for that thread and only so long as needed to perform garbage collection with respect to that thread's thread-only objects.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for managing memory, comprising:
    determining which, if any, objects included in a set of objects associated with a first thread included in a plurality of threads associated with a heap are no longer reachable;
    garbage collecting any objects of the set that are not determined to be reachable;
    keeping track of which objects stored in the heap are included in the set of objects associated with the first thread; and
    removing an object from the set of objects associated with the first thread if the object becomes associated with a thread other than the first thread.

2. The method of claim 1, wherein the set includes only objects not associated with any thread other than the first thread.

3. The method of claim 1, wherein the set includes only objects that were created by the first thread and are not referenced, directly or indirectly, by any object not associated with a thread other than the first thread.

4. The method of claim 1, wherein determining includes starting from a reduced root set, traversing objects included in the set of objects associated with the first thread, and marking all objects determined to be reachable directly or indirectly from the reduced root set.

5. The method of claim 4, wherein the reduced root set includes objects comprising a stack associated with the first thread.

6. The method of claim 4, wherein the reduced root set does not include one or more of the following: global variables and local variables associated with threads other than the first thread.

7. The method of claim 4, wherein garbage collecting includes performing garbage collection processing with respect to any object(s) included in the set of objects associated with the first thread that have not been marked as having been determined to be reachable, directly or indirectly, from the reduced root set.

8. The method of claim 1, wherein keeping track includes allocating and configuring a data structure configured to be used to store for each object included in the set data identifying the object.

9. The method of claim 1, wherein keeping track includes storing data indicating an object has been added to the set upon receiving an indication that the object is being or has been created by the first thread.

10. The method of claim 1, wherein the object becomes associated with a thread other than the first thread includes receiving an indication that a reference to the object has been or is being written into an object not included in the set.

11. The method of claim 1, wherein the object becomes associated with a thread other than the first thread includes receiving an indication that a reference to the object has been or is being written to global storage.

12. The method of claim 1, further comprising removing from the set the object and recursively all objects referenced directly or indirectly by the object.

13. The method of claim 1, wherein garbage collecting includes performing finalization processing with respect to an object with respect to which finalization is required.

14. The method of claim 1, wherein garbage collecting includes performing finalization processing with respect to an object that is referenced by a referencing object with respect to which finalization is required.

15. The method of claim 1, wherein finalization processing is performed, if required, by the first thread.

16. The method of claim 1, further comprising reusing directly one or more memory locations associated with a garbage collected object.

17. The method of claim 16, wherein reusing directly includes considering the one or more memory locations to be available for reuse by the first thread without first returning said one or more memory locations to a shared or other pool.

18. The method of claim 1, further comprising determining that a criteria/on for performing garbage collection with respect to the first thread has/have been met.

19. The method of claim 1, further comprising prompting the first thread to perform said steps of determining and garbage collecting.

20. A computer system, comprising:
a memory comprising a heap with which a plurality of processing threads are associated; and
a processor coupled to the memory and configured to:
determine which, if any, objects included in a set of objects associated with a first thread included in a plurality of threads associated with the heap are no longer reachable;
garbage collect any objects of the set that are not determined to be reachable;
keep track of which objects stored in the heap are included in the set of objects associated with the first thread; and
remove an object from the set of objects associated with the first thread if the object becomes associated with a thread other than the first thread.

21. The computer system of claim 20, wherein the plurality of threads run on the processor.

22. The computer system of claim 20, wherein the first thread is configured to determine which, if any, objects included in the set of objects associated with the first thread are no longer reachable; and garbage collect any objects of the set that are not determined to be reachable.

23. The computer system of claim 20, wherein the set includes only objects not associated with any thread other than the first thread.

24. The computer system of claim 20, wherein to determine includes starting from a reduced root set, traversing objects included in the set of objects associated with the first thread, and marking all objects determined to be reachable directly or indirectly from the reduced root set.

25. The computer system of claim 20, wherein the processor is further configured to remove from the set the object and recursively all objects referenced directly or indirectly by the object.

26. A computer program product for managing memory, the computer program product being embodied in a computer readable storage medium and comprising computer instructions for:
determining which, if any, objects included in a set of objects associated with a first thread included in a plurality of threads associated with a heap are no longer reachable;
garbage collecting any objects of the set that are not determined to be reachable;
keeping track of which objects stored in the heap are included in the set of objects associated with the first thread; and
removing an object from the set of objects associated with the first thread if the object becomes associated with a thread other than the first thread.

27. The computer program product of claim 26, wherein the set includes only objects not associated with any thread other than the first thread.

28. The computer program product of claim 26, wherein determining includes starting from a reduced root set, traversing objects included in the set of objects associated with the first thread, and marking all objects determined to be reachable directly or indirectly from the reduced root set.

29. The computer program product of claim 26, further comprising removing from the set the object and recursively all objects referenced directly or indirectly by the object.

* * * * *